Aug. 23, 1960   L. J. JACOBS   2,949,704
REFRACTORY MATERIALS
Filed Sept. 26, 1957
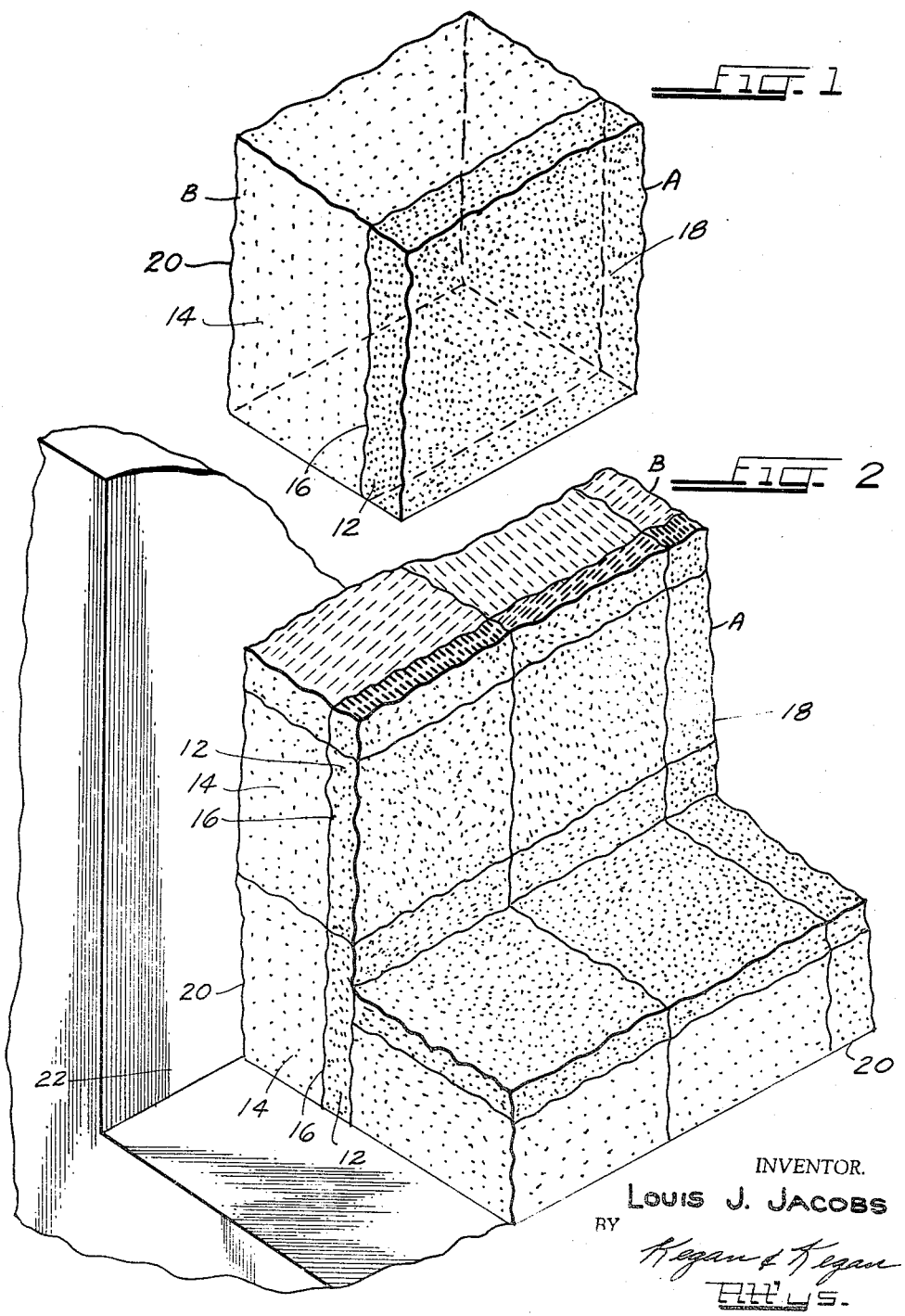
INVENTOR.
LOUIS J. JACOBS
BY

United States Patent Office 2,949,704
Patented Aug. 23, 1960

2,949,704

REFRACTORY MATERIALS

Louis J. Jacobs, Chicago, Ill., assignor to The S. Obermayer Co., Chicago, Ill., a corporation of Ohio Filed Sept. 26, 1957, Ser. No. 686,365

8 Claims. (Cl. 50—464)

The instant invention relates to novel refractory materials, methods for their manufacture, and uses of said materials. More particularly, it relates to two-ply refractory materials having improved characteristics and strength, when heated at temperatures as high as about 3400° F.

Refractory materials are widely used in industry, and frequently a refractory is needed for use at temperatures between about 2800° F. and 3400° F. To be satisfactory for most uses at high temperatures, a refractory material should be strong, durable, and should be able to withstand thermal shock. It should also be substantially inert when contacted with various corrosive substances, oxidizing or reducing atmospheres, or the like, encountered in certain metallurgical furnaces, ducts for exhaust of hot gases, or the like.

Currently available refractories, such as the fire clay base refractories, have proved unsatisfactory at temperatures between 3000° F. and 3400° F. because they become thermoplastic, and/or cannot withstand the thermal shock, and/or are not inert to corrosive substances, such as alkali. In an attempt to overcome these defects, laminated refractory materials using two types of brick have been prepared. However, these materials proved impractical, because they crumbled apart or separated at the joint when heated at high temperatures.

It is an object of the instant invention to provide improved refractory materials capable of satisfactory performance at temperatures up to about 3400° F. and methods for their manufacture.

It is a further object of the instant invention to provide two-ply plastic monolithic refractories which are strong, durable, and which do not split at the joint at temperatures up to about 3400° F.

It is a further objects of the instant invention to provide commercially practical two-ply plastic refractory-lined monolithic structures, such as refractory lined furnace chambers, ducts, and the like, said linings being substantially inert to most oxidizing agents, reducing atmospheres and/or corrosive substances.

It is a further object of the instant invention to provide two-ply plastic refractory bricks and slabs which when rammed or molded into place provide a comparatively low cost and a strong, thermal shock resistant lining for chambers, hot gas ducts, and the like which are to be exposed at temperatures up to about 3400° F.

These and other objects of the instant invention will be more fully understood from the following description.

I have developed a two-ply plastic refractory material which will withstand thermal shock, is strong, long lasting, resists abrasion and corrosion, and which does not split or crumble at the joint when used as a lining in furnaces, hot gas ducts, or the like, even at temperatures up to about 3400° F. A specific example showing a preferred embodiment of the invention is illustrated in the drawings, but it is to be understood that the invention is not limited to this example.

In the drawings:

Figure 1 shows a slab of the two-ply plastic refractory material.

Figure 2 shows a sectional cut of a furnace lined with the instant two-ply plastic refractory.

The instant novel refractories consist essentially of a two-ply laminated plastic refractory having a primary layer of alumina-containing plastic refractory referred to herein as refractory "A," and a secondary layer of a novel glass-forming plastic refractory designated as "B." The layer of refractory A forms the inside or exposed wall of a refractory lined structure, while the layer of refractory B, which backs it, faces the form, frame, or insulation to form a monolithic structure therewith.

The individual refractories A and B are manufactured by preparing plastic homogeneous mixtures of the ingredients listed in Tables I and II respectively and within the percent by weight ranges given.

TABLE I

*Composition of refractory A*

| Ingredients: | Percent by weight |
|---|---|
| Alumina (about 3 to 10 mesh size) | 40 to 65 |
| Alumina (finer than 100 mesh) | 20 to 35 |
| Kaolin | 5 to 15 |
| Kyanite (about 20 to 50 mesh size) | 5 to 15 |
| Aluminum phosphate | 2 to 12 |
| Water | 2 to 8 |

TABLE II

*Composition of refractory B*

| Ingredients: | Percent by weight |
|---|---|
| Calcined flint clay (about 3 to 10 mesh size) | 50 to 70 |
| Kyanite (about 20–50 mesh size) | 5 to 15 |
| Bond clay (plastic kaolinite fire clay) | 10 to 20 |
| Plastic ball clay | 2 to 10 |
| Water | up to 11 |

A slab of the two-ply plastic refractory as shown in Figure I comprises a layer or slab of plastic refractory A, 12, and a slab of refractory B, 14. The slabs of A and B can be shaped by means of a hydraulic press, by extrusion, or any other convenient means, and cut into slabs of any desired size. For example, slabs of A measuring 3" x 2" x 12" and of B measuring about 3" x 7" x 12" are formed, then pressed together to form joint 16 and to produce a finished slab or block measuring about 3" x 9" x 12". It will be understood that the center dimensions, namely, 2", 7" and 9" respectively represent the thickness of various blocks. These slabs are set in the furnace wall with A on the hot face and B on the cold face.

The layers of each refractory can be varied in thickness, and the resulting two-ply material can be shaped as desired. The thickness of layer A is preferably about 2 inches, and the two-ply slab or block having a total thickness of about 9 inches is suitable for most uses. In the instant laminated refractories layer A should be at least about ¼ inch thick. For most uses, layer A will be between about 1½ inch and about 3 inches thick, because of the initial cost of the refractory and of the supporting structure. Generally layer B is at least 5 inches thick, preferably between about 6 inches and about 7½ inches in thickness because of the insulating characteristics possessed by B.

When a furnace or other structure is lined with the instant refractory, for example with slabs about 9 inches in thickness, the 3" x 12" face 20 of refractory B, which is beige in color, is placed against the furnace frame or insulation 22 in Figure 2; and the 3" x 12" face 18 of refractory A, which is white, is the exposed face inside the structure. The slabs of the instant laminated refractory are initially damp, and they can be rammed or molded into place. Because they are plastic, they will conform to the shape of the furnace walls; and upon heating a monolithic structure is formed.

In another embodiment, a monolithic refractory lining for a furnace, duct, or the like is formed by lining the structure with refractory B of at least five inches thickness, and laminating refractory A of at least one-fourth inch thickness to the surface of the installed refractory B by ramming or by placement pneumatically.

There is no tendency for the instant plastic refractories to break, separate, or crumble at the joint even when exposed to temperatures of about 3400° F. A furnace lined with the instant refractory can be used at temperatures above the limits at which super duty fire clay refractory is satisfactory, because the fire brick laminated refractories separate or crumble at the joint when heated to temperatures above about 3000° F.

The stability of the instant plastic refractory is due to the fact that the permanent linear change of the refractories is very low, that is less than about 1%. The thermal expansions of refractory A and of refractory B are similar at temperatures up to about 2200° F; while at higher temperatures, plastic A remains a refractory and a glass phase is formed in my novel plastic refractory B. This glass has a viscosity and volume which accommodates the thermal expansion of refractory A.

In a preferred embodiment, plastic refractory A is manufactured by preparing a plastic homogeneous mixture from the following:

|  | Percent |
|---|---|
| Alumina (approximately 6 mesh size) | 50 |
| Alumina (approximately 320 mesh size) | 25 |
| Kaolin (pyrometric cone value 34) | 7 |
| Kyanite (approximately 35 mesh size) | 8 |
| Aluminum phosphate | 6 |
| Water | 4 |
|  | 100 |

The plastic refractory B is manufactured by preparing a plastic homogeneous mixture of the following:

|  | Percent |
|---|---|
| Calcined flint clay (approximately 3 mesh size) | 61 |
| Kyanite (approximately 35 mesh size) | 11 |
| Bond clay (plastic kaolinite fire clay) | 10 |
| Plastic ball clay | 9 |
| Water | 9 |
|  | 100 |

The aluminum oxide used in preparing refractory A is known commercially as alumina or tabular alumina and is aluminum oxide converted to its corundum form by heating to temperatures slightly below the fusion point (3700° F.). Refractory A contains a total of about 90% by weight of aluminum oxide which should be of high purity, that is it must not contain substances which would change its thermal expansion properties.

Two fractions of alumina of different particle size ranges are used in refractory A. The comparatively coarse fraction contains alumina particles of sizes ranging from about 3 mesh and about 10 mesh (and fines). The particles are preferably about 6 mesh size.

The second alumina fraction contains particles of about 100 mesh size and finer. In a typical preferred embodiment, this alumina is about 320 mesh size.

The kaolin used in preparing refractory A can be a pulverized and air floated Georgia kaolin. It has a pyrometric cone equivalent of about 34 (U.S. Bureau of Standards, Journal American Ceramic Society, volume 9, 70, 1926) and had a chemical analysis as follows:

|  | Percent |
|---|---|
| Alumina | 39.68 |
| Silica | 44.76 |
| Ferric oxide | 0.24 |
| Titanium oxide | 1.30 |
| Calcium oxide | 0.02 |
| Magnesium oxide | 0.05 |
| Alkalies | 0.05 |
| Phosphorous pentoxide | 0.16 |
| Loss on ignition | 13.74 |

The kyanite used in refractories A and B can be a crushed raw Virginia kyanite having a mesh size of between about 20 and about 50, preferably about 35. Kyanite is an alumina silicate mineral. The composition is approximately 63% alumina and 37% silica. On heating, it is converted to mullite and a siliceous glass.

The aluminum phosphate bonding agent can have a ratio $Al_2O_3:3P_2O_5$ from 1 to 1.67 and can vary in form from a solid to an aqueous solution. A typical aluminum phosphate suitable for use is sold under the trade name "Alkophos" by Monsanto Chemical Co.

The calcined flint clay in refractory B is prepared from flint fire clay which must be of the type which occurs naturally as an unstratified massive rock, practically devoid of natural plasticity and showing a conchoidal fracture. It is calcined to remove shrinkage, and is then crushed to the size of between about 3 mesh and about 10 mesh.

Various plastic kaolinite fire clays and plastic ball clays such as Tennessee or Kentucky ball clays, can be used in refractory B and are commercially available and known to all skilled in the art.

Sufficient water is added to the other ingredients of A and B to obtain a moldable mass. The ingredients are mixed just long enough to produce a plastic homogeneous mixture. The resulting plastic refractories can be molded, pressed, or extruded into slabs of A and B.

This high alumina refractory A is of exceptional strength and stability at temperatures as high as 3400° F. and has high resistance to thermal spalling, excellent resistance to abrasion, erosion, and to the corrosive action of gases and of slags of a wide range of composition.

The instant novel plastic refractory B has insulating properties as well as strength and a low coefficient of thermal expansion. It is not weakened by contact with plastic A, and there is no tendency for separation at the joint of A and B because upon heating a special type glass is formed in B capable of accommodating the movement and expansion of refractory A. Refractories A and B also stay together upon cooling. In order to obtain this unique glass-containing refractory, the above described clays must be employed within the stated ranges. I have been unable to discover any equivalent of clay or substitute ingredients, with or without additives, which when used yield a glass having the characteristics necessary for a satisfactory two-ply laminated plastic refractory.

There are a number of advantages in the use of the instant laminated refractories, such as one having a layer of refractory A two inches thick and a layer of B seven inches thick, as compared to use of currently available refractories or even as compared to use of the instant refractory A alone having a thickness of about nine inches. Plastic refractory A and conventional high alumina refractories are substantially more costly than the instant novel refractory B, as well as being heavier, and lacking the insulation properties of refractory B. Use of the preferred two-ply refractory substantially reduces the initial cost of refractory and of the supporting structure, and reduces the heat loss and operating cost.

For example, a nine inch thick furnace lining of refractory A with a hot face temperature of 3000° F., will have a cold face temperature of 690° F.; and the heat loss will be 3410 B.t.u. per square foot per hour. On the other hand, a lining of laminated refractory having a layer of A two inches thick and a layer of B seven inches thick with a hot face temperature of 3000° F. will have a cold face temperature of only 506° F. The junction or interface between refractories A and B will have a temperature of 2747° F. The heat loss in this instance is only 1768 B.t.u. per square foot per hour as compared to 3410 B.t.u. when A alone is used.

In order to fully illustrate the scope of the instant invention, but without intention to be limited to the details, the following examples are given.

EXAMPLE I

A plastic refractory type A was prepared by mixing in a muller type mixer the following percents by weight of ingredients until a homogeneous mixture was obtained:

|  | Percent |
|---|---|
| Alumina (about 6 mesh size) | 49.5 |
| Alumina (about 320 mesh size) | 25.2 |
| Kaolin | 7.2 |
| Kyanite (about 35 mesh size) | 8.1 |
| Aluminum phosphate | 6.3 |
| Water | 3.7 |

The resulting plastic mixture was extruded to obtain a slab with a 3" x 12" face and two inches in thickness.

Refractory of the type B was prepared by mixing the following ingredients until homogeneous and extruding the resulting mixture to obtain a slab with a 3" x 12" face and seven inches thick:

|  | Percent |
|---|---|
| Calcined flint clay (about 3 mesh size) | 61.4 |
| Kyanite (about 35 mesh size) | 11.3 |
| Plastic kaolinite fire clay | 10.0 |
| Plastic ball clay | 8.2 |
| Water | 9.1 |

A two-ply laminated refractory was obtained when slabs of refractories A and B were pressed together on a hydraulic press to obtain a slab about nine inches thick. Alternately, the plastic refractories A and B can be extruded together to obtain the laminated refractory.

Table III shows the results obtained when the above refractories A and B were subjected to chemical analysis.

TABLE III

*Analysis of plastic refractories on calcined basis*

|  | Refractory "A"—Calcined Basis, percent | Refractory "B"—Calcined Basis, percent |
|---|---|---|
| Alumina | 92.03 | 43.05 |
| Silica | 7.33 | 52.04 |
| Ferric oxide | 0.41 | 1.35 |
| Titania | 0.20 | 2.20 |
| Calcium oxide | 0.01 | 0.31 |
| Magnesium oxide | 0.01 | 0.27 |
| Alkalies | 0.01 | 0.78 |
|  | 100.00 | 100.00 |

This two-ply plastic refractory has no tendency to separate or crumble at the junction when it is dried or fired or upon cooling after firing.

EXAMPLE II

The strength of the laminated refractory prepared as described in Example I was determined by transverse loading after heating to various temperatures. Laminated blocks measuring 2" x 2" x 9" were formed from 2" x 2" x 2" slabs of refractory A and 2" x 2" x 7" slabs of refractory B. The blocks were supported at two points, seven inches apart and one inch from each end of the block. The load was applied to the center. Table IV shows the temperatures at which the block was heated prior to the loading and the pounds per square inch transverse strength.

TABLE IV

*Transverse strength of laminated refractory*

| Temperature degrees Fahrenheit: | Pounds per square inch |
|---|---|
| 230 | 120 |
| 1550 | 188 |
| 2350 | 546 |
| 2550 | 822 |
| 3000 | 540 |

A specimen of the laminated refractory prepared as described in Example I was cut from a furnace wall that had been heated at 3000° F., and its transverse strength, determined as described above, was 540 pounds per square inch. In no case did refractory A and refractory B separate or break at the joint. This was also true when a specimen was heated to 3400° F. through 25 cycles.

In summary, the instant invention provides novel refractory material and refractory-lined structures and methods for their manufacture. Slabs of two plastic refractories, designated herein as refractory A and refractory B are manufactured, and the slabs are pressed together to obtain a two-ply refractory. Both refractories have very small thermal linear expansion, and have special characteristics which are different from each other but which accommodate each other. For these reasons, the instant laminated plastic refractory is strong, will withstand shock, and will not separate or crumble at the junction when heated to temperatures up to 3400° F.

Compared to currently available refractory materials suitable for use at high temperatures, the instant laminated refractory has advantages in performance and in economy. The conventional refractories which can be heated between 2800° F. and 3400° F. are much more expensive initially and in operation than the instant laminated refractory, and/or they will not withstand thermal shock or the action of slag, furnace atmospheres, dust or fumes, and the like.

The instant novel refractory is especially suitable for lining furnaces, such as reverberatory furnaces for melting aluminum, and iron and steel tube-forming furnaces; and for lining hot gas chambers, doors, and ducts, such as ducts under open hearth furnaces, escape ducts for waste gases, and the like.

Having thus fully described and illustrated the character of the instant invention, what is desired protected by Letters Patent is:

1. A laminated refractory block consisting essentially of a primary layer of refractory and a secondary layer of plastic refractory arranged to become glassy at a temperature of about 2200° F., the layers each being homogeneous mixtures by weight of the following ingredients in percent:

| Primary layer | Percentages | Secondary layer | Percentages |
|---|---|---|---|
| Alumina (about 3 to 10 mesh) | 50 | Calcined flint clay (about 3 to 10 mesh) | 61 |
| Alumina (100 mesh and finer) | 25 | Kyanite (about 20 to 50 mesh) | 11 |
| Kaolin | 7 | Plastic kaolinite fire clay | 10 |
| Kyanite (about 20 to 50 mesh) | 8 | Plastic ball clay | 9 |
| Aluminum phosphate | 6 | Water | 9 |
| Water | 4 |  |  |
|  | 100 |  | 100 |

2. A laminated plastic refractory consisting essentially of a primary layer stable at temperatures up to 3400° F. and consisting essentially of plastic refractory of at least 60% tabular alumina and a supporting layer of plastic refractory which becomes a glass at a temperature above 2200° F. and which consists essentially of a homogeneous mixture of about 60% by weight calcined flint clay of between about 3 and about 10 mesh size, about 10% by weight kyanite of between about 20 and about 50 mesh size, about 10% by weight plastic kaolinite fire clay, about 10% by weight plastic ball clay, and the remainder water.

3. The laminated plastic refractory of claim 2 wherein the thickness of the glass-forming layer is at least about 6 inches, and the thickness of the primary layer is at least ¼ inch.

4. Two-ply monolithic refractory slabs consisting essentially of a primary layer of plastic refractory containing a major portion of corundum and suitable for exposure to temperatures up to about 3400° F., and a secondary layer of glass-forming plastic refractory, the composition of said layers on a calcined basis by weight being typified by the following chemical analysis:

|  | Primary Layer, percent | Secondary Layer, percent |
| --- | --- | --- |
| Alumina | 92.03 | 43.05 |
| Silica | 7.33 | 52.04 |
| Ferric oxide | 0.41 | 1.35 |
| Titania | 0.20 | 2.20 |
| Calcium oxide | 0.01 | 0.31 |
| Magnesium oxide | 0.01 | 0.27 |
| Alkalies | 0.01 | 0.78 |

5. A two-ply monolithic refractory which withstands temperatures up to about 3400° F. without breaking at the joint comprising a primary layer of refractory corundum, and a secondary layer of glass-forming plastic refractory, the primary layer consisting essentially of a homogeneous mixture of the following ingredients by weight:

Ingredients: Percent by weight
Corundum (about 3 to 10 mesh size) ____ 40 to 65
Corundum (about 100 mesh size and finer) _ 20 to 35
Kaolin _____ 5 to 15
Kyanite (about 20 to 50 mesh size) _____ 5 to 15
Aluminum phosphate _____ 2 to 12
Water _____ 2 to 8 and the secondary layer consisting essentially of a homogeneous mixture of the following ingredients:

Ingredients: Percent by weight
Calcined flint clay (about 3 to 10 mesh size) _____ 50 to 70
Kyanite (about 20 to 50 mesh size) _____ 5 to 15
Plastic kaolinite fire clay _____ 10 to 20
Plastic ball clay _____ 2 to 10
Water _____ 8 to 11

6. In structures lined with refractory material, the improvement characterized by a two-ply plastic refractory lining comprising: a primary layer adapted to be exposed to high temperatures and prepared by mixing about 50% by weight of between about 3 and 10 mesh size calcined alumina, about 25% by weight of about 100 mesh size and finer calcined alumina, about 7% kaolin, about 8% by weight of between about 20 and about 50 mesh size kyanite, about 6% aluminum phosphate, and the remainder water; and a supporting layer prepared by mixing about 60% by weight calcined flint clay of between about 3 and about 10 mesh size, about 10% by weight kyanite of between about 20 and about 50 mesh size, about 15% by weight plastic kaolinite fire clay, about 5% by weight plastic ball clay, and the remainder water; the primary layer of said refractory being the exposed surface of the lining.

7. The method for the manufacture of a two-ply plastic refractory comprising preparing a homogeneous refractory mixture of:

Percent by weight
Alumina (about 3 to 10 mesh size) _____ 40 to 65
Alumina (about 320 mesh size) _____ 20 to 35
Kaolin _____ 5 to 15
Kyanite (about 20–50 mesh size) _____ 5 to 15
Aluminum phosphate _____ 2 to 12
Water _____ 2 to 8 forming a primary layer from the resulting mixture; preparing a homogeneous refractory mixture of:

Percent by weight
Calcined flint clay (about 3 to 10 mesh size) __ 50 to 70
Kyanite (about 20 to 50 mesh size) _____ 5 to 15
Plastic kaolinite fire clay _____ 10 to 20
Plastic ball clay _____ 2 to 10
Water _____ up to 11.0 forming a secondary layer from the resulting mixture; and forming a laminated block consisting of a layer of the primary refractory and a layer of the secondary refractory.

8. The method for the manufacture of laminated plastic refractories comprising: preparing a homogeneous mixture of primary refractory consisting essentially of about 50% by weight of about 6 mesh size alumina, about 25% by weight of about 320 mesh size alumina, about 7% by weight kaolin, about 8% by weight of about 35 mesh size kyanite, about 6% by weight aluminum phosphate, and the remainder water; preparing a homogeneous mixture of secondary refractory consisting essentially of about 60% by weight of calcined flint clay of about 3 mesh size, about 10% by weight of kyanite of about 35 mesh size, about 10% by weight of plastic kaolinite fire clay, about 9% by weight of plastic ball clay, and the remainder water; and forming a two-ply refractory slab consisting of a layer of the primary refractory having a thickness of about 2 inches and a layer of secondary refractory having a thickness of about 7 inches.

References Cited in the file of this patent

UNITED STATES PATENTS

| | | |
| --- | --- | --- |
| 1,016,350 | McKnight et al. | Feb. 6, 1912 |
| 1,448,684 | Beecher | Mar. 13, 1923 |
| 1,803,999 | Curtis | May 5, 1931 |
| 1,856,613 | Ackermann | May 3, 1932 |
| 2,479,504 | Moore | Aug. 16, 1949 |

UNITED STATES PATENT OFFICE
CERTIFICATE OF CORRECTION

Patent No. 2,949,704            August 23, 1960

Louis J. Jacobs

It is hereby certified that error appears in the printed specification of the above numbered patent requiring correction and that the said Letters Patent should read as corrected below.

Column 1, line 49, for "objects" read -- object --; column 5, line 8, after "to" insert -- more --.

Signed and sealed this 4th day of April 1961.

(SEAL)
Attest: ERNEST W. SWIDER

~~XXXXXXXXX~~
Attesting Officer

ARTHUR W. CROCKER
Acting Commissioner of Patents